US006188148B1

(12) United States Patent
Curreno

(10) Patent No.: US 6,188,148 B1
(45) Date of Patent: Feb. 13, 2001

(54) MARKING DEVICE

(76) Inventor: Marie Christine Curreno, 4, rue Lieutenant Vittoz, Rillieux (FR), 69140

(*) Notice: Under 35 U.S.C. 154(b), the term of this patent shall be extended for 0 days.

(21) Appl. No.: 09/287,629

(22) Filed: Apr. 7, 1999

(30) Foreign Application Priority Data

Apr. 10, 1998 (FR) ........................................ 98 04875
May 27, 1998 (FR) ........................................ 98 06863

(51) Int. Cl.$^{7}$ ........................................ H02K 41/00
(52) U.S. Cl. ........................................ 310/12
(58) Field of Search ........................ 310/12, 13, 14; 178/18.01, 18.03; 33/18.1

(56) References Cited

U.S. PATENT DOCUMENTS 3,851,196 * 11/1974 Hinds ........................ 310/12
3,982,165 * 9/1976 Rich ........................ 318/568
4,422,027 * 12/1983 Mohlere ........................ 318/687
5,126,648 6/1992 Jacobs ........................ 318/640
5,818,721 10/1998 Funahashi ........................ 364/474.24

FOREIGN PATENT DOCUMENTS 9407399 9/1994 (DE) .
446378 9/1991 (EP) .
2731087 8/1996 (FR) .

* cited by examiner

*Primary Examiner*—Thomas M. Dougherty
*Assistant Examiner*—Judson H. Jones
(74) *Attorney, Agent, or Firm*—Dowell & Dowell, P.C.

(57) ABSTRACT

A marking device including a framework and a mechanism for driving a marking tool with respect to the framework, wherein the mechanism includes an element fixed with respect to the framework and a mobile element which carries the marking tool. First and second linear motor elements are provided to displace the mobile element in a first direction and a second direction perpendicular to the first direction.

16 Claims, 6 Drawing Sheets

Fig. 5
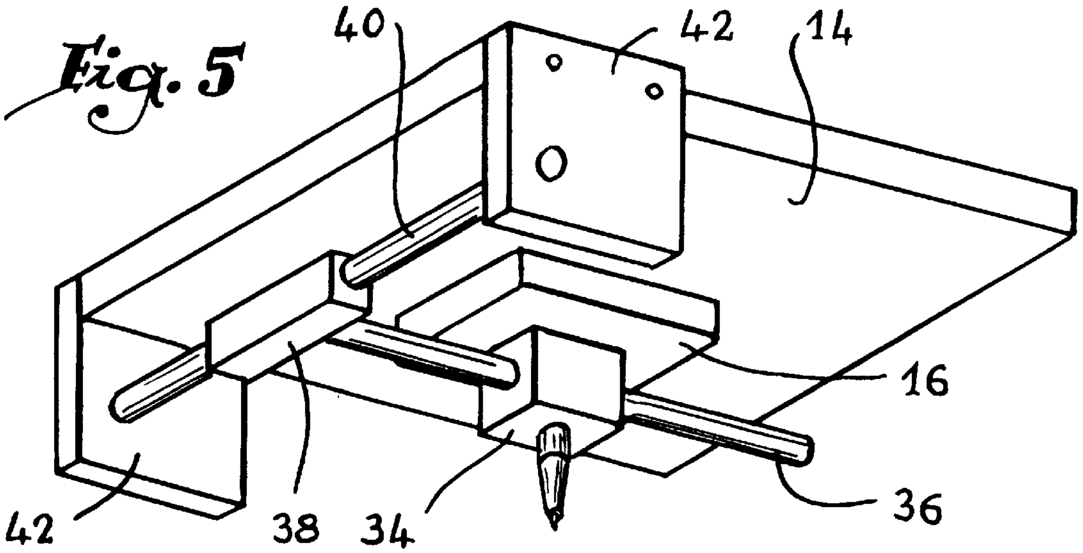
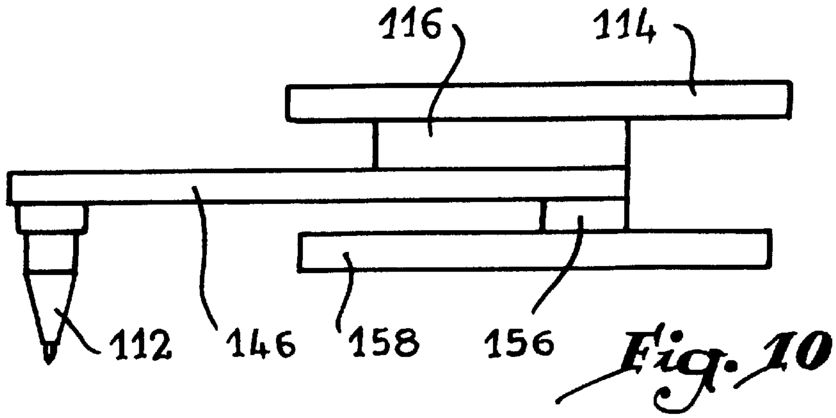
Fig. 10
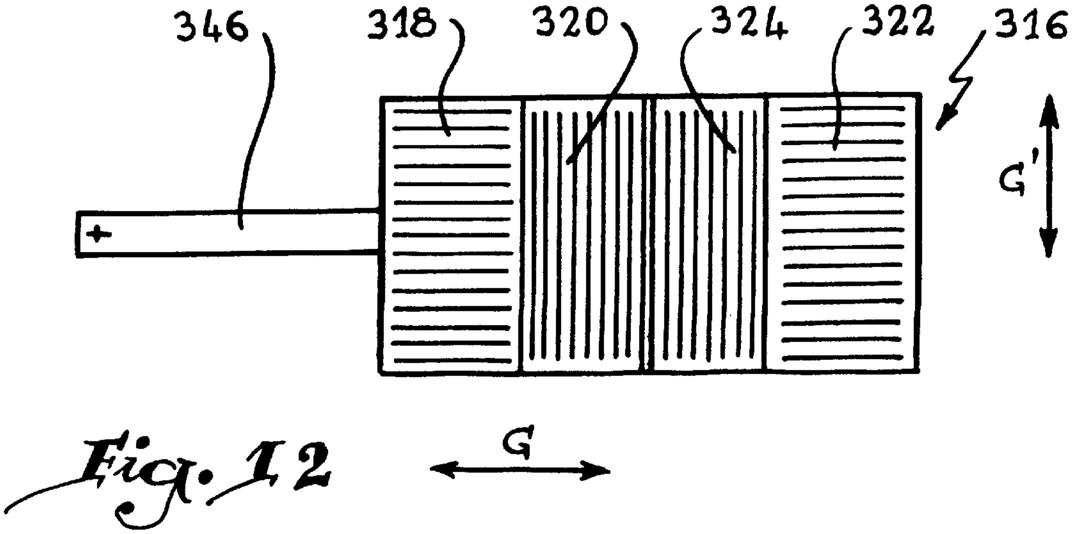
Fig. 12

MARKING DEVICE

BACKGROUND OF THE INVENTION

1. Field of the Invention

The present invention relates to a marking device.

Within the scope of the invention, the generic term "marking device" designates any device for making a pattern on the surface of a piece, whether by printing, deformation or removal of matter at the level of this surface.

2. Brief Discussion of the Related Art

A marking device comprises, in known manner, a framework supporting a mechanism for driving a marking tool, which may be a pneumatic stylus or an engraving head. Such a drive mechanism conventionally comprises an element fixed with respect to the framework, provided with raised edges on which are disposed two guide bars. A first carriage is mounted to slide on said bars and is itself provided with two additional bars, perpendicular to the first couple of bars and which are intended for receiving a second carriage to which the marking tool is fastened.

Thanks to the use of this so-called "crossed carriage" system, the marking tool is adapted to move in two directions perpendicular to each other, with respect to the fixed element.

However, such a marking device has certain drawbacks. In effect, the high number of its constituent elements leads to the existence of considerable functional clearances. Moreover, the rigidity of these constituent elements is relatively slight, due to their lightness, with the result that they are sometimes subjected, in service, to certain deformations. Finally, such a marking device sometimes employs synchronous belts for driving the carriages, inducing a phenomenon of elastic deformation. All these characteristics therefore results in a certain lack of precision in the positioning of the marking tool thus produced.

Moreover, the different constituent elements of the marking device are subjected to considerable frictions, with the result that the mechnanical output of this device is not optimum.

In order to overcome the drawbacks of the prior art set forth hereinabove, the invention proposes producing a marking device which, while being sufficiently light, guarantees a precise positioning of the marking tool and is subjected, in service, to slight frictions.

SUMMARY OF THE INVENTION

To that end, the invention relates to a marking device comprising a framework and a mechanism for driving a marking tool with respect to the framework, said drive mechanism comprising an element fixed with respect to said framework, a mobile element secured to said marking tool and means for displacing said mobile element with respect to said fixed element in two directions perpendicular to each other, characterized in that said displacement means comprise a first linear motor element adapted to displace said mobile element in a first direction and a second linear motor element adapted to displace said mobile element in a second direction perpendicular to the first direction.

BRIEF DESCRIPTION OF THE DRAWINGS

The invention will be more readily understood on reading the following description given solely by way of non-limiting example with reference to the accompanying drawings, in which:

FIGS. 5 and 6 are views in perspective illustrating the drive mechanism of a marking device according to second and third embodiments of the invention.

FIG. 10 is a side view illustrating another variant of the invention.

FIG. 12 is a view similar to FIG. 3, of an additional embodiment of the invention.

DESCRIPTION OF PREFERRED EMBODIMENTS

Figure 1:
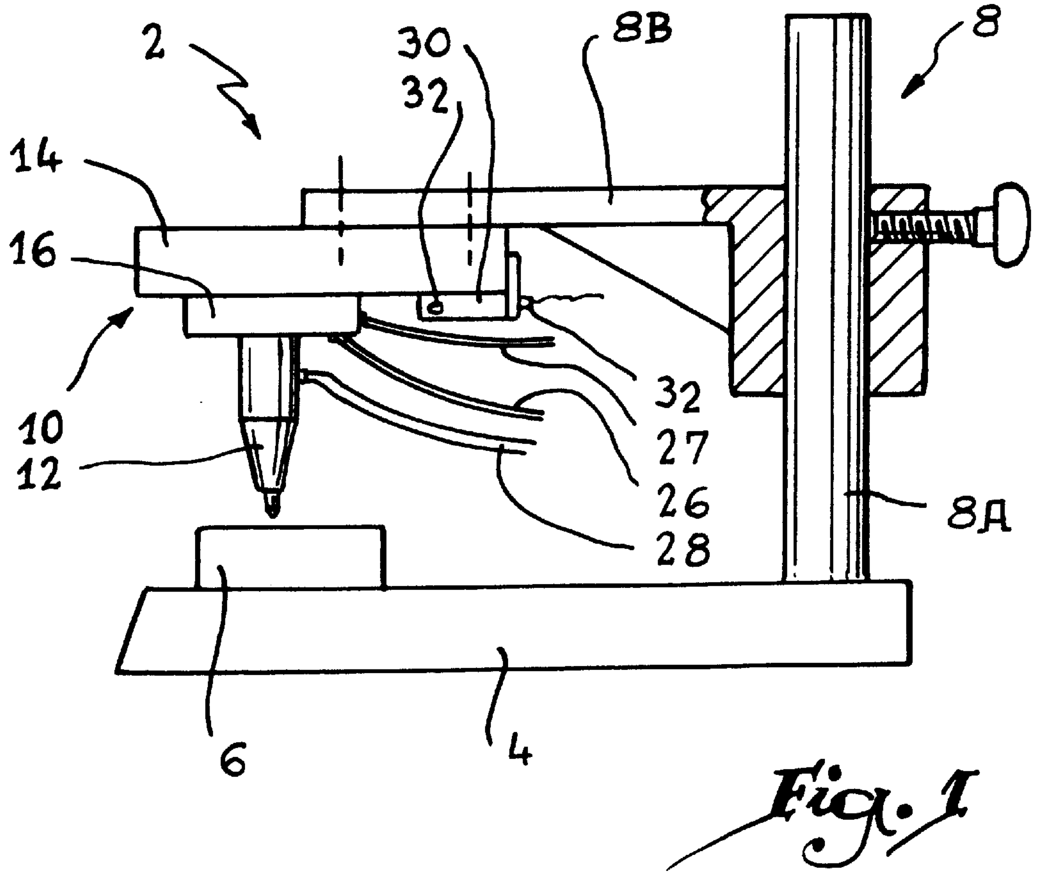
FIG. 1 is a side view of a marking device according to a first embodiment of the invention.

Referring now to the drawings, the marking device shown in FIG. 1, generally designated by reference 2, comprises a base 4 for receiving a piece 6 to be marked. A bracket 8 extends from the base 4, at a distance from the area of reception of the piece 6 to be marked, and comprises a vertical column 8A on which may be connected a horizontal bar 8B whose height may be adjusted by any appropriate means.

The end of the bar 8B, opposite bracket 8A, is fastened, for example by screwing, to a mechanism 10 for driving a marking tool 12. The latter is, in the example shown, a pneumatic stylus, but the invention is also applicable to other tools, such as, for example, an electromagnetic stylus, an engraving milling cutter or an instrument depositing ink.

This drive mechanism 10 comprises a fixed element 14, of substantially parallelepipedic shape. A mobile element 16, which is likewise substantially parallelepipedic, is capable of moving, in two directions perpendicular to each other, in the vicinity of the lower face 14A of the fixed element 14, namely the one opposite bar 8B.

Figure 4:
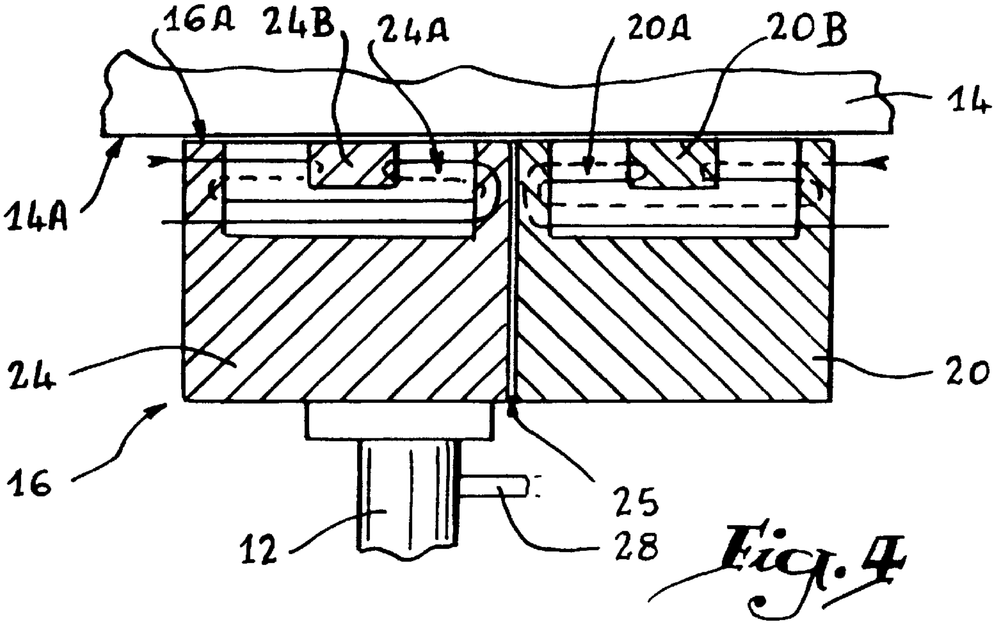
FIG. 4 is a view in section along line IV—IV in FIG. 3.
Figure 3:
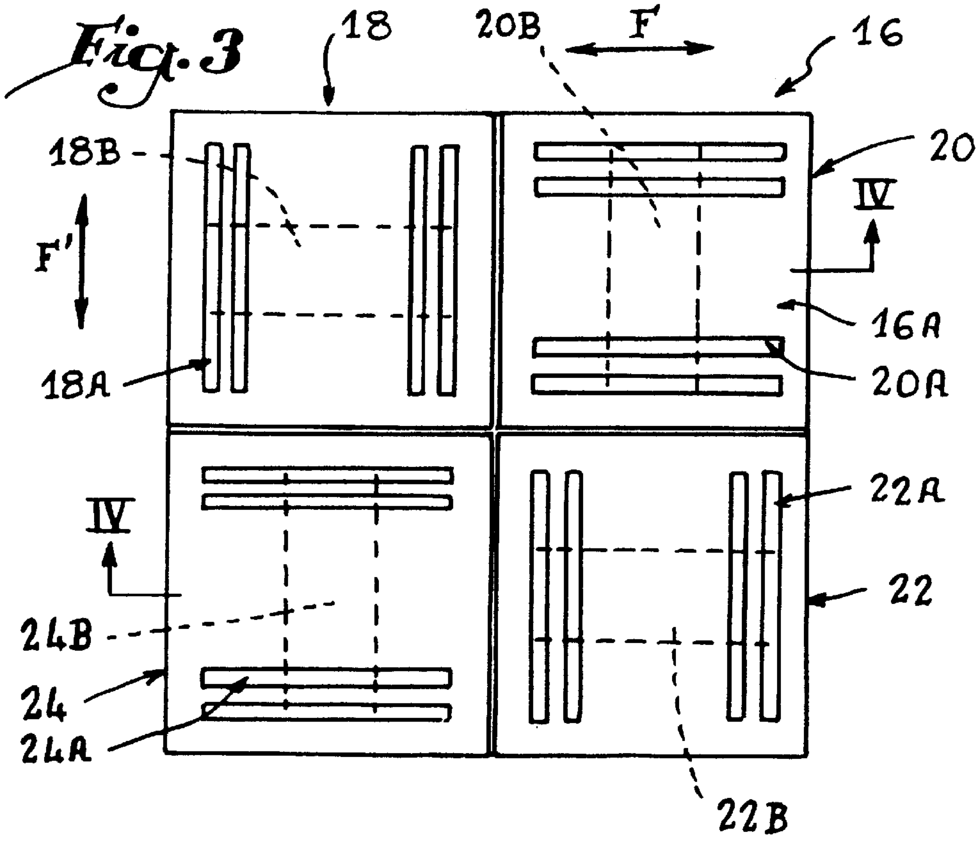
FIG. 3 is a schematic plan view of a mobile carriage of the drive mechanism shown in FIG. 2.

As shown more precisely in FIGS. 3 and 4, the displacement of the mobile element 16 with respect to the fixed element 14 is effected by employing the phenomenon of induction. To that end, the fixed element (inductor)14 forming a stator and the mobile element (armature) 16 forming a carriage, are such as those marketed for example by the firm 3D Automation under the name Planar/Drive and form a planar linear motor.

The armature 16 is made in the form of four individual modules 18, 20, 22 and 24, of which each comprises a coil 18A, 20A, 22A, 24A and a magnetic core 18B, 20B, 22B, 24B associated therewith, both embedded in resin. The principal directions of the opposite coils, namely, on the one hand, those 18A and 22A, and, on the other hand, those 20A and 24A, are parallel to one another. The opposite surfaces, made of soft iron, of the fixed element 14 and of the magnetic cores 18B, 20B, 22B, 24B are provided with respective teeth (not shown), intended to be mutually aligned when the current passes in the coil.

By varying the characteristics of the current in the coils 18A and 22A, it is possible to displace the armature carriage 16 in a first direction materialized by arrow F. This carriage is capable of moving in a perpendicular direction, materialized by arrow F', by selective passage of the current in the coils 20A and 24A. The modules 18 and 22, on the one hand, 20 and 24 on the other hand, form first and second linear motor elements making it possible to displace the carriage in first and second directions perpendicular to each other.

Each module 18, 20, 22, 24 is the seat of a permanent magnet, with the result that carriage 16 is permanently attracted by the ferric surface of the fixed element 14 forming stator. The currents of these coils are furnished in known manner by electronic, two-phase stepper motor supply cards.

An air passage 25 is in addition arranged in the body of the carriage 16. This air passage is supplied by means of a pipe 26, shown in FIGS. 1 and 2 and allows the formation, in service, of an air cushion between the opposite plane faces 14A, 16A of the fixed element 14 and the carriage 16. Electrical supply of the coils is ensured in known manner via a line 27.

The stylus 12 is fixed to the carriage 16, for example by adhesion. It may also be provided to dispose, in the resin of one of the modules of the carriage, a metal plate to which the stylus is fastened by screwing.

Figure 2:
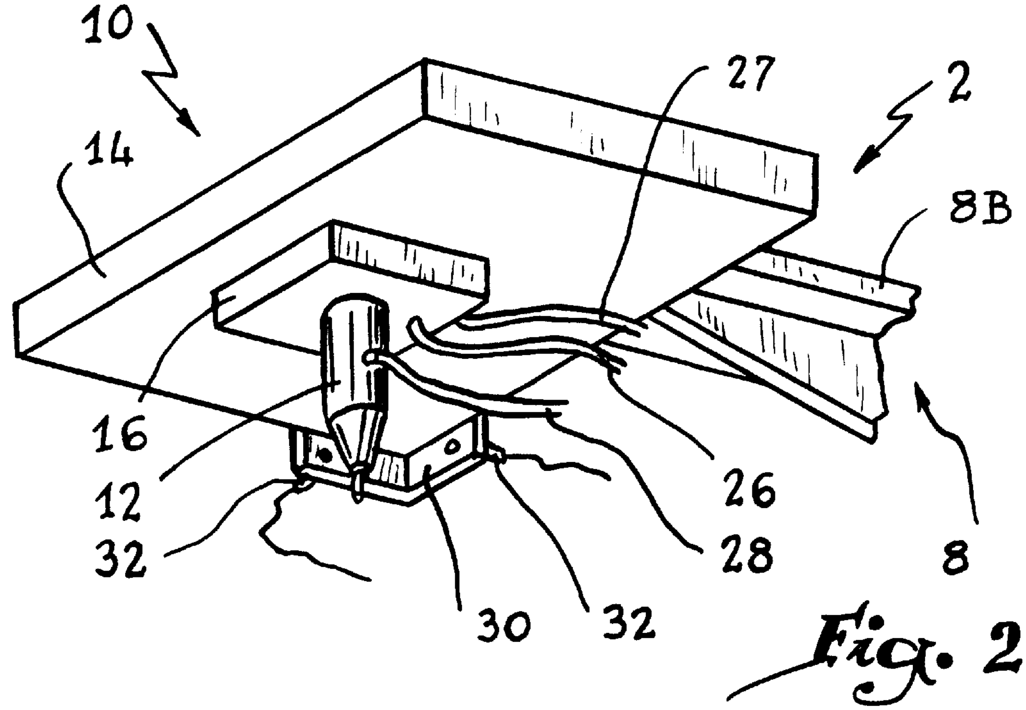
FIG. 2 is a view in perspective of the mechanism for driving the marking tool of the marking device shown in FIG. 1.

The pneumatic stylus 12 is supplied via a pipe 28, in known manner. Referring more particularly to FIG. 2, an end angle 30 is fixed at one of the corners of the fixed element 14. Each of the arms of this angle 30 receives a sensor 32, with the result that this angle ensures precise positioning of the carriage 16. This angle thus constitutes an origin of coordinates for the carriage 16. This origin is attained when the marking device is put into operation, by an automatic movement in the direction of the angle, which movement is interrupted as soon as sensors 32 are actuated.

FIG. 5 shows a second embodiment of the invention. The mobile element 16 is provided, opposite the fixed element 14, with a bush 34 slidably receiving a first bar 36 extending in a first direction. This bar 36 is connected, at one of its ends, to a transverse sleeve 38 capable of sliding with respect to a second bar 40. The latter, which extends perpendicularly to the first bar 36, is fastened to two cheeks 42 extending from the fixed element 14.

During displacement of the mobile element 16 with respect to the fixed element 14, the two bars 36, 40 guide this mobile element in two directions perpendicular to each other, and therefore prevents it from pivoting about a vertical axis. This contributes to ensuring good operational reliability, being given that the risks of uncoupling of the mobile element 16, under the effect of such a pivoting, are particularly low.

Figure 6:
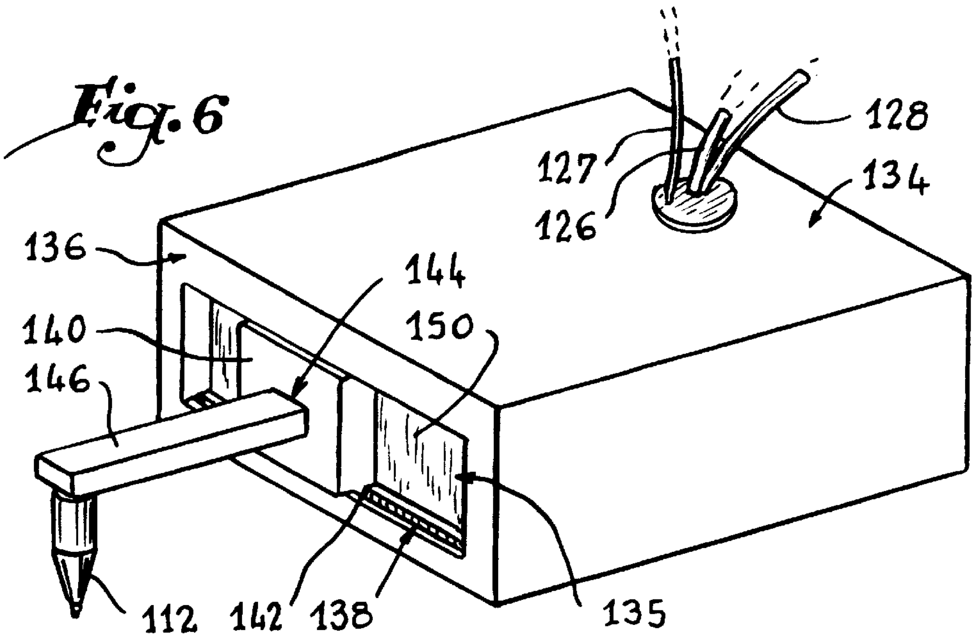
Figure 7:
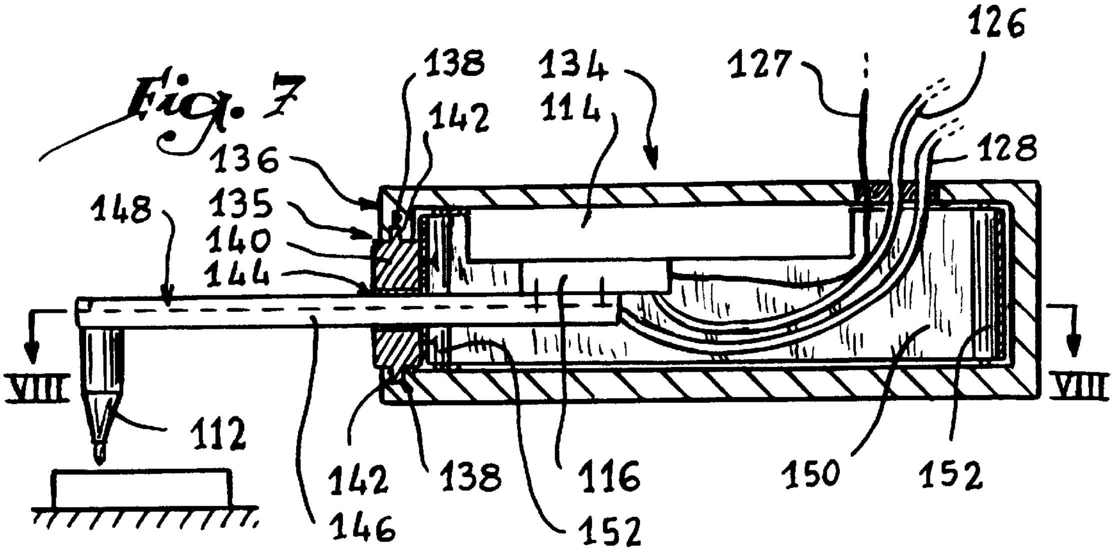
FIG. 7 is a view in section, in the principal direction of the arm of the drive mechanism shown in FIG. 6.
Figure 8:
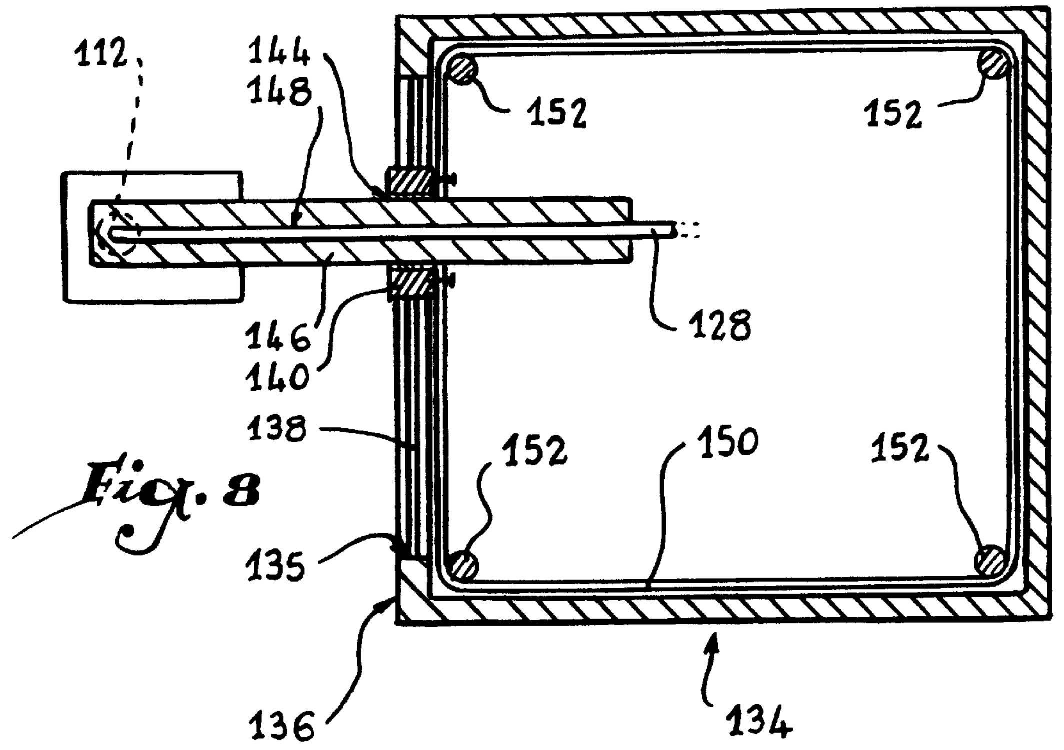
FIG. 8 is a view in section along line VIII—VIII in FIG. 7.

A third embodiment of the invention is shown in FIGS. 6 to 8, in which elements identical to those of FIGS. 1 to 4 are designated by the same reference numerals increased by 100. The fixed element 114 and the carriage 116 are disposed inside a parallelepipedic casing 134, secured to a bracket (not shown), similar to bracket 8 of the preceding Figures.

The casing 134, which is substantially closed, is provided with an opening 135 at one, 136, of its lateral faces. As shown in particular in FIG. 7, the opposite walls of the casing 134, constituting the upper and lower peripheries of the opening 135, are each provided with a longitudinal U-shaped rail 138. A mobile apron 140, which is provided with ribs 142 and whose longitudinal dimensions are clearly smaller than those of rails 138, is slidably received in these rails 138, via ribs 142.

This apron 140 has a median opening 144 made therein for receiving an arm 146 fixed, at a first end, to the carriage 116 and bearing, at its other end, a marking stylus 112. This arm 146 has a longitudinal housing 148 hollowed out therein for receiving an air pipe 128 for supplying the stylus. Furthermore, the carriage is supplied with air and electricity by a pipe 126 and a line 127, respectively.

A band 150, for example made of metal, extends over the whole inner periphery of the lateral faces of the casing 134. This band, which forms a closed loop, is mounted on four rollers and is fixed to the apron 140. In addition, it is pierced, over a part of its height, with an opening for passage of the arm 146.

In service, when the carriage is displaced in the principal direction of the arm 146, the latter is able to slide within respective openings made in the apron 140 and in the band 150, these two latter elements remaining fixed. When the carriage is displaced perpendicularly to the principal direction of the arm 146, the latter causes the apron 140 to slide along the rails 138, and the band 150 to move around rollers 152. The band 150 protects the fixed element 114 (inductor) and the carriage 116 (armature) from outside dust and dirt.

Moreover, the apron 140 and the rails 138 ensure guiding of the arms 146 in two directions perpendicular to each other, which limits the risks of uncoupling of the mobile element by its pivoting about a vertical axis.

Figure 9:
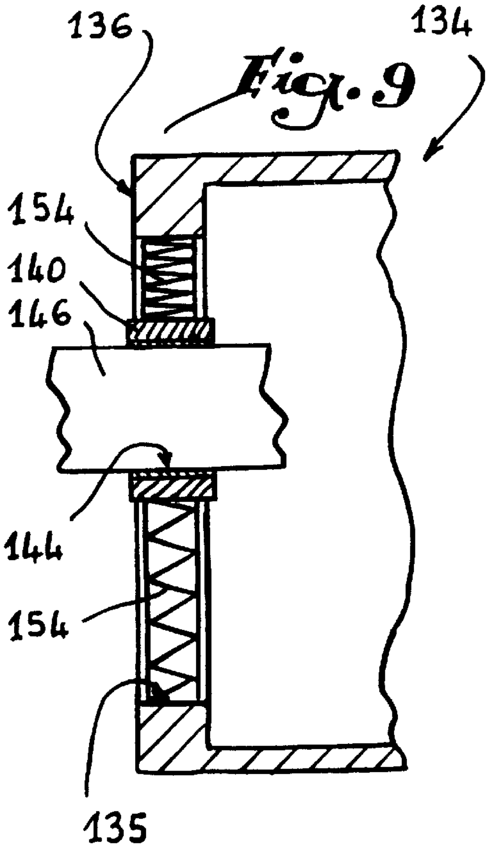
FIG. 9 is a view in section, similar to FIG. 8, illustrating another embodiment of the invention.

As shown in FIG. 9, the band 150 and its support rollers 152 may be replaced by two gussets 154 mounted on rails 138 and disposed on either side of the apron 140 for receiving the arm 146. These gussets 154 are fixed, at each of their lateral ends, respectively to the walls of the casing 134 and to the lateral faces of the apron 140. During displacement of the apron perpendicularly to the principal direction of the arm 146, these gussets 154 are in a position to fold or unfold, so as to guarantee overall seal of the whole of the casing 134.

According to another variant of the invention, shown in FIG. 10, the arm 146 is secured, opposite the carriage 116, with a holding member 156 free to move with respect to a support element 158, which is fixed with respect to the framework of the marking device (not shown in this Figure).

The member 156 may be a passive piece free to move with respect to the support element 158 thanks to an air cushion. Displacement of the member 156 may also be ensured via an additional linear motor, which makes it possible to give the means for displacing the arm 146 a particularly high driving power.

The presence of such a member 156 makes it possible substantially to reduce all risk of the arm 146 tipping downwardly under the effect of the moment induced by the marking member 112, even if this arm 146 presents very considerable longitudinal dimensions.

Figure 11:
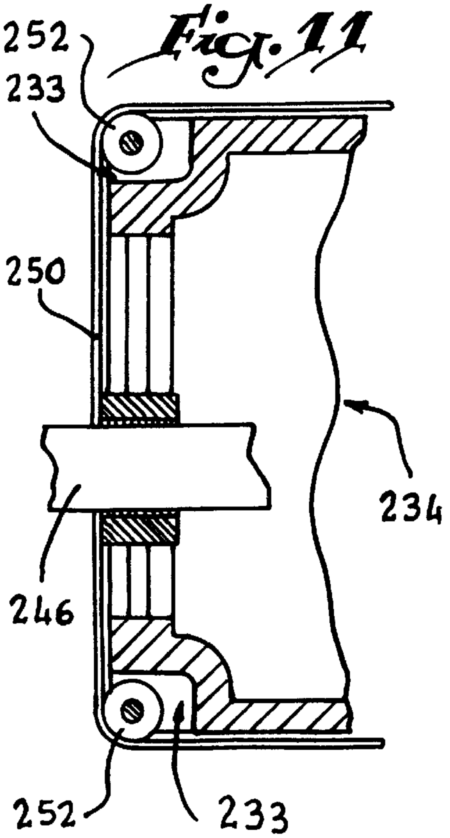
FIG. 11 is a view in section, similar to FIG. 8, illustrating an additional embodiment of the invention.

FIG. 11 shows an additional variant embodiment of the invention, in which a metal band 250, forming a closed loop, is mounted on rollers 252 disposed in setbacks 233 in the casing 234, made at each corner thereof. This band 250 therefore extends to the outer periphery of the lateral faces of the casing 234 and is able to accompany the movements of the arm 246, while ensuring seal of the casing 234.

FIG. 12 shows an additional variant of the invention, in which the mobile element 316 receives an arm 346 supporting a marking tool (not shown). This mobile element comprises four individual modules 318, 320, 322 and 324, whose structure is similar to that of modules 18 to 24 described with reference to FIGS. 3 and 4.

However, these modules 318 to 324 are arranged differently, in that the modules 318 and 322, which make it possible to displace the mobile element in a first direction shown by arrow G', are disposed opposite, on either side of the two modules 320 and 324 allowing the displacement of the mobile element 316 in the direction shown by arrow G perpendicular to arrow G'. All the modules are aligned in the principal direction of arm 346.

This configuration makes it possible considerably to reduce the risks of pivoting of the mobile element 316 about a vertical axis, which might provoke uncoupling of this mobile element with respect to the fixed element (not shown in this Figure).

Figure 13:
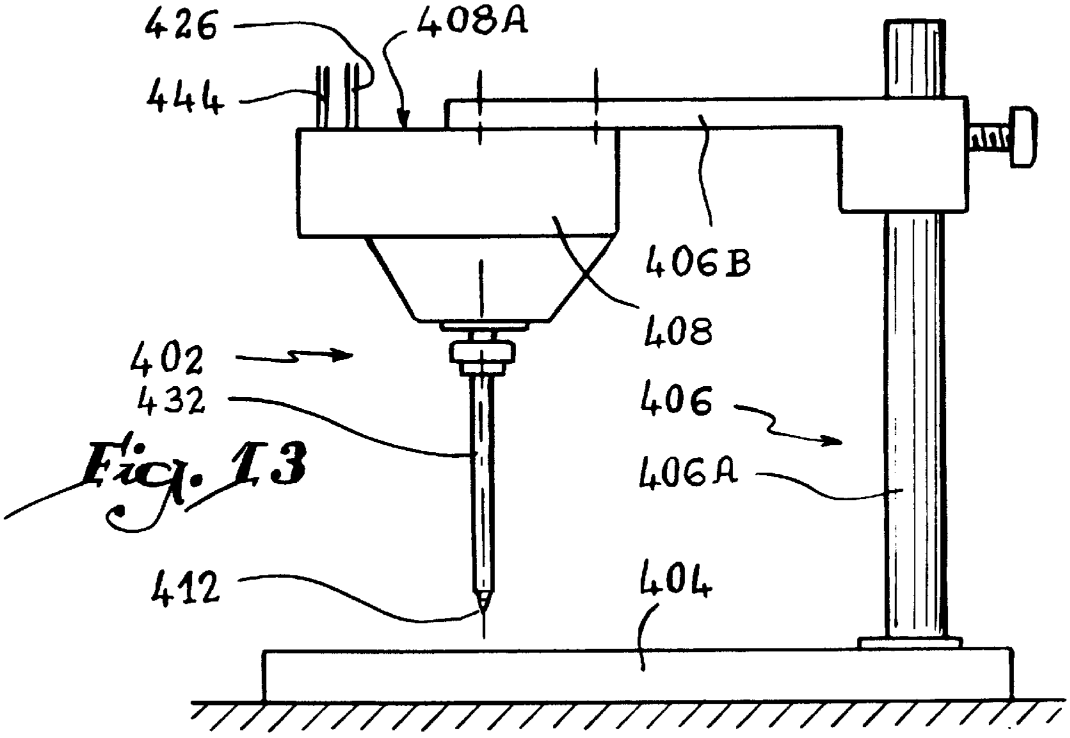
FIG. 13 is a side view of a marking device in accordance with another embodiment of the invention.

FIG. 13 shows a marking device according to an additional embodiment of the invention, which is generally designated by reference 402 and comprises a base 404 for receiving a piece to be marked (not shown). A bracket 406 extends from the base 404, at a distance from the area for receiving the piece to be marked and comprises a vertical column 406A on which may be connected a horizontal bar 406B whose height is adjustable by any appropriate means.

A substantially closed enclosure 408 is connected, by its upper wall 408A, to the end of the bar 406B, opposite the bracket 406. This enclosure 408 receives the mechanism 410 for driving a marking tool 412. The latter is, in the example shown, a pneumatic stylus, but the invention is equally applicable to other tools, such as for example an electromagnetic stylus, an engraving milling cutter or an instrument depositing ink.

This drive mechanism 410 comprises a fixed element 414, of generally parallelepipedic shape and which is fixed, for example by screwing, against the upper wall 408A of the enclosure 408.

A mobile element 416, which is likewise parallelepipedic, is capable of moving, in two directions perpendicular to each other, near the lower face 414A of the fixed element 414, namely the one opposite the bar 406B.

The mobile element 416 is displaced with respect to the fixed element 414 by employing the phenomenon of induction, similarly to what has been described with reference to FIGS. 3 and 4.

An air passage (not shown) is arranged in the body of the carriage 416. This air passage is supplied by means of a pipe 426 and allows the formation, in service, of an air cushion between the opposite plane faces 414A, 416A of the fixed element 414 and of carriage 416. This pipe 426 and this line penetrates, with seal, at the level of the upper wall 408A of the enclosure 408.

A finger 428 is fixed to the carriage 416 for example by adhesion. It may also be provided to dispose, in the resin of the modules of the carriage, a metal plate to which this finger 428 is fastened by screwing. This finger 428 is secured, at its end opposite the carriage, with a ball-joint 430 ensuring pivoting articulation of the marking tool 412 with respect to the carriage 416.

Figure 14:
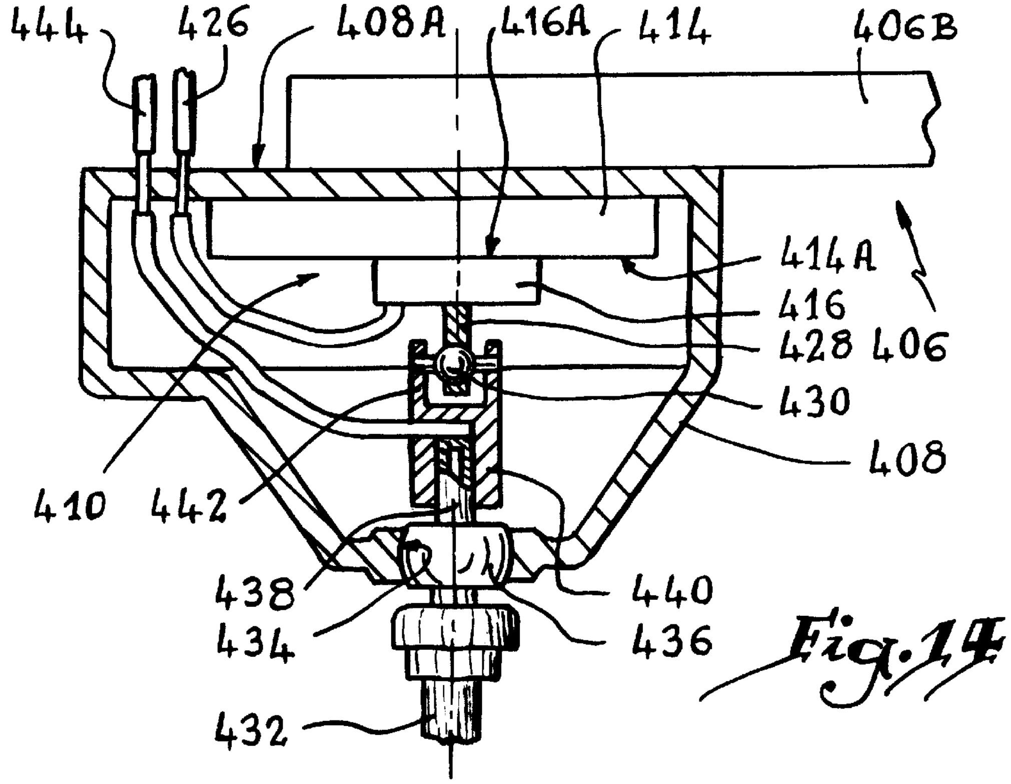
FIG. 14 is a view in section of the drive mechanism of the marking device shown in FIG. 13.

With particular reference to FIG. 14, the marking tool 412 is mounted at the lower end of a maneuvering rod 432 which passes through the enclosure 408 via an opening 434, of concave spherical profile. This opening 434 constitutes a bearing for a spherical ball 436 of corresponding profile, secure to the maneuvering rod 432.

The end 438 of the rod 432, opposite the marking tool 412, is capable of sliding within a housing with which is provided an intermediate piece 440 articulated on the ball joint 436, via a fork 442. It should be noted that the connection between the finger 428 and the piece 440 may be of the universal joint type. The maneuvering rod 432 and the intermediate piece 440 form an element for supporting the marking tool 412.

The pipe 444 ensuring air supply of the pneumatic stylus 412 penetrates via the upper wall 408A of the enclosure 408 and opens out within the housing of the intermediate piece 440, intended for slidably receiving the maneuvering rod 432.

When the carriage 416 (armature) is displaced with respect to the fixed element 414, the marking tool 412 also moves, due to the double articulation of the rod 432, both with respect to carriage 416 and to the walls of the enclosure 408.

The invention is also applicable to separate first and second linear motor elements, disposed at a distance from each other on the mobile element.

The invention makes it possible to attain the objects mentioned hereinabove. In effect, the use of a fixed inductor element cooperating with a mobile armature element makes it possible to employ a very small number of constituent pieces, which tends to reduce the clearances, compared to the marking devices of the prior art. Moreover, none of these constituent elements is capable of deforming in service, this ensuring a very precise positioning for the marking tool of the device according to the invention.

Moreover, the use of this inductor and this armature brings about a noteworthy reduction of the frictions with respect to the marking devices of the prior art which employ numerous mechanical elements. This is allowed thanks to using an air cushion interposed between the opposite faces of the inductor and armature.

The fact of disposing the marking tool on an arm makes it possible to offset the marking area out of the area of drive of the mobile element.

Finally, the fact of disposing the inductor and the armature in a sealed enclosure guarantees a satisfactory protection of the whole mechanism for driving the marking tool, from dust and dirt.

What is claimed is:

1. Marking device comprising a framework and a marking tool, a drive mechanism for moving said marking tool with respect to the framework, said drive mechanism including a first element fixed with respect to said framework and a second mobile element to which said marking tool is mounted, said second mobile element having a first surface opposing said first element and a second surface oriented oppositely of said first surface, said marking tool extending outwardly relative to said second surface, displacement means for displacing said second mobile element with respect to said first element in two directions perpendicular to each other, and said displacement means including a first linear motor element adapted to displace said mobile element in a first direction and a second linear motor element adapted to displace said mobile element in a second direction perpendicular to the first direction.

2. The marking device of claim 1, wherein said first and second linear motor elements are assembled one over another within said second mobile element so as to form a single linear motor adapted to be displaced in two directions perpendicular to one other.

3. The marking device of claim 1, wherein the marking tool is directly mounted to said second mobile element.

4. The marking device of claim 3, wherein said first element is provided, at a corner thereof, with an angle having a sensor for sensing a positioning of said second mobile element at a position of origin.

5. The marking device of claim 3, wherein said second mobile element is moveably guided by a first guide bar extending in a first direction, said first guide bar being movably guided in a second direction, perpendicular to the first direction, with respect to a second guide bar mounted to the framework of the device.

6. The marking device of claim 1, wherein said marking tool is mounted on an arm carried by said second mobile element.

7. The marking device of claim 6, wherein said first element and said second mobile element are disposed in a casing, said arm and said mobile element projecting out of an opening in a lateral face of said casing and being free to slide in the first direction through a support element disposed in said opening made in said lateral face of the casing, said support element being adapted to move transversely in the second direction with respect to the first direction of the arm along said opening, and sealing means to maintain a seal of said opening in said casing when said support element moves in said second direction.

8. The marking device of claim 7, wherein said sealing means includes a closed loop extending within said casing, said loop being provided with an opening for passage of said arm.

9. The marking device of claim 7, wherein said sealing means includes two gussets disposed within said opening in the lateral face of said casing on opposite sides of said support element.

10. The marking device of claim 6, including a holding member for holding the arm and fixed to said arm opposite said second mobile element, said holding member being movable, by second displacement means, relative to a surface of a support element fixedly mounted with respect to the framework.

11. The marking device of claim 10, wherein said displacement means includes third and fourth linear motor elements adapted to move said mobile member in two directions perpendicular to each other, with respect to said support element.

12. The marking device of claim 6, wherein said first and second linear motor elements each comprise at least two modules, two opposite modules of said first linear motor element being placed on either side of two central modules of said second linear motor element, said two opposite modules and said two central modules being substantially aligned along a principal axis of said arm.

13. The marking device of claim 1, where said marking tool is carried by a support element pivotal both with respect to said second mobile element and with respect to a fixed area of the framework.

14. The marking device of claim 13, wherein said support element is mounted to pivot with respect to said second mobile element by an articulation element fixed on said second mobile element.

15. A marking device comprising a framework and a marking tool, a drive mechanism for moving said marking tool with respect to said framework, said drive mechanism including a first element fixed with respect to said framework and a second mobile element to which said marking tool is mounted, displacement means for displacing said second element with respect to said first element in two directions perpendicular to each other, said displacement means including a first linear motor element adapted to displace said mobile element in a first direction and a second linear motor element adapted to displace said mobile element in a second direction perpendicular to the first direction, and said first element having at a corner thereof an angle having sensors for detecting a positioning of said second mobile element at a position of origin.

16. A marking device comprising a framework and a marking tool, a drive mechanism for moving said marking tool with respect to said framework, said drive mechanism including a first element fixed with respect to said framework and a second mobile element to which said marking tool is mounted, displacement means for displacing said second element with respect to said first element in two directions perpendicular to each other, said displacement means including a first linear motor element adapted to displace said mobile element in a first direction and a second linear motor element adapted to displace said mobile element in a second direction perpendicular to the first direction, and said second element being movably guided by a first guide bar extending in a first direction, said first guide bar being movably guided in a second direction, perpendicular the first direction with respect to a second guide bar mounted to the framework.

* * * * *